(12) United States Patent
Ide et al.

(10) Patent No.: US 8,596,115 B2
(45) Date of Patent: Dec. 3, 2013

(54) EXHAUST GAS PRESSURE LOSS CALCULATION DEVICE FOR ENGINE

(75) Inventors: Kazunari Ide, Tokyo (JP); Tomohide Yamada, Tokyo (JP); Satoshi Yamada, Tokyo (JP); Kazuki Nishizawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 49 days.

(21) Appl. No.: 13/386,076

(22) PCT Filed: Jun. 11, 2010

(86) PCT No.: PCT/JP2010/059940
§ 371 (c)(1),
(2), (4) Date: Apr. 3, 2012

(87) PCT Pub. No.: WO2011/096099
PCT Pub. Date: Aug. 11, 2011

(65) Prior Publication Data
US 2012/0192635 A1    Aug. 2, 2012

(30) Foreign Application Priority Data

Feb. 8, 2010   (JP) .................................. 2010-025846

(51) Int. Cl.
*G01M 15/10*   (2006.01)
(52) U.S. Cl.
USPC ...................................................... 73/114.76
(58) Field of Classification Search
USPC ................. 73/114.69, 114.74, 114.75, 114.76
See application file for complete search history.

(56) References Cited

U.S. PATENT DOCUMENTS

| 5,398,541 A * | 3/1995 | Hijikata et al. ................... 73/38 |
| 8,161,738 B2 * | 4/2012 | He et al. ........................... 60/296 |

(Continued)

FOREIGN PATENT DOCUMENTS

| JP | 7-77028 | 3/1995 |
| JP | 2003-49633 | 2/2003 |

(Continued)

OTHER PUBLICATIONS

International Search Report issued Sep. 14, 2010 in corresponding International Application No. PCT/JP2010/059940.

(Continued)

*Primary Examiner* — Eric S McCall
(74) *Attorney, Agent, or Firm* — Wenderoth, Lind & Ponack, L.L.P.

(57) ABSTRACT

An object of the present invention is to provide a corrected exhaust gas pressure loss calculation device which corrects an exhaust gas pressure loss that varies from moment to moment in accordance with engine operating conditions to a corrected exhaust gas pressure loss that can be used directly in control. The present invention converts an exhaust gas pressure into the corrected exhaust gas pressure loss, which is an exhaust gas pressure loss under a reference condition, from a relationship between an exhaust gas mass flow rate and an exhaust gas mass flow rate under the reference condition, a relationship between an exhaust gas temperature and an exhaust gas temperature under the reference condition, a relationship between the exhaust gas pressure and an exhaust gas pressure under the reference condition, and a relationship between an exhaust gas viscosity coefficient under a condition of the exhaust gas temperature and a viscosity coefficient of a viscous gas under the reference condition.

5 Claims, 6 Drawing Sheets

(56) References Cited

U.S. PATENT DOCUMENTS

| | | | |
|---|---|---|---|
| 2003/0140623 A1 | 7/2003 | Ootake | |
| 2005/0188686 A1 | 9/2005 | Saito et al. | |
| 2008/0155963 A1* | 7/2008 | Iida | 60/273 |
| 2009/0000367 A1* | 1/2009 | Ohata | 73/114.74 |

FOREIGN PATENT DOCUMENTS

| | | |
|---|---|---|
| JP | 2005-240730 | 9/2005 |
| JP | 3856118 | 9/2006 |
| JP | 2007-40269 | 2/2007 |

OTHER PUBLICATIONS

Decision to Grant a Patent issued Jul. 2, 2013 in corresponding Japanese Application No. 2010-025846 (with English translation).

Machine translation of Japanese Patent Application Publication No. 2007-40269, published Feb. 15, 2007.

International Preliminary Report on Patentability and Written Opinion of the International Searching Authority issued Sep. 18, 2012 in corresponding International Application No. PCT/JP2010/059940 (with English translation).

Notice of Allowance issued Aug. 28, 2013 in corresponding Korean Application No. 10-2012-7000905 (with English translation).

* cited by examiner

EXHAUST GAS PRESSURE LOSS CALCULATION DEVICE FOR ENGINE

TECHNICAL FIELD

The present invention relates to an exhaust gas pressure loss calculation device for an engine having an exhaust passage provided with a filter which collects microparticles contained in an exhaust gas.

BACKGROUND ART

In a conventional technique, a DPF (Diesel Particulate Filter) is provided in an exhaust passage to purify an exhaust gas discharged from an engine. With this technique of providing a DPF in the exhaust passage, soot constituted by microparticles (PM) contained in the exhaust gas is collected by the DPF.

When a DPF is provided in the exhaust passage, the soot collected by the DPF accumulates in the DPF. When an amount of soot accumulated in the DPF increases, an exhaust gas pressure loss increases, leading to a reduction in an intake air amount of the engine.

If, at this time, control is performed with respect to EGR for recirculating a part of the exhaust gas to an air supply side, for example, while maintaining target signals (an excess air ratio, an excess oxygen ratio, a supply air flow rate, and so on) of the EGR control at fixed values, an EGR control valve is controlled to a closing side, leading to a reduction in an EGR gas amount, and as a result, an effect of reducing harmful substances in the exhaust gas through EGR decreases.

Therefore, control must be executed precisely in accordance with increases and reductions in the exhaust gas pressure loss.

A technique disclosed in Patent Document 1 is available as an example of control executed in accordance with increases and reductions in the exhaust gas pressure loss. In this technique, a DPF pressure loss condition is determined from a relationship between a DPF front-rear differential pressure and an exhaust gas amount, and when, on the basis of a result of this determination, the pressure loss is larger than a set value, DPF regeneration processing is implemented. Further, when the DPF front-rear differential pressure is not large enough to merit DPF regeneration processing, an upper limit of a fuel injection amount is modified to an increasing side such that a decreasing engine torque is compensated for by an increase in the exhaust gas pressure loss due to soot accumulation in the DPF. When an exhaust gas temperature reaches or exceeds a limit value due to the increase in the exhaust gas pressure loss, on the other hand, the exhaust gas temperature is set at or below the limit value by correcting the fuel injection amount to a decreasing side.

Further, a technique disclosed in Patent Document 2 is available as another example of control executed in accordance with increases and reductions in the exhaust gas pressure loss. In this technique, an intake air amount of the engine is limited when an exhaust manifold pressure exceeds a limit pressure, and the exhaust manifold pressure is calculated on the basis of a DPF pressure loss and a DPF differential pressure. Further, the intake air amount is limited on the basis of a comparison between the DPF differential pressure and a limit value. Furthermore, limits are applied to both the engine intake air amount and the fuel injection amount.

Patent Document 1: Japanese Patent No. 3856118
Patent Document 2: Japanese Patent Application Publication No. 2007-40269

In the technique disclosed in Patent Document 1, however, a regeneration start determination value is determined from the exhaust gas flow rate and the filter pressure loss, and then compared with an actual filter pressure loss to determine whether to switch correction control ON/OFF. However, the correction control ON/OFF evaluation is preferably not performed as is because between exhaust gas flow rate variation and filter pressure loss variation, sensor response differences and pressure response delays relative to the flow rate and variation may occur. Further, increases and reductions in the pressure loss are evaluated simply from the pressure loss of the filter portion, and pressure loss in pipe parts to the front and rear of the filter is not evaluated. It cannot therefore be said that an accurate evaluation is performed with respect to the pressure loss.

Further, in the technique disclosed in Patent Document 2, the exhaust gas flow rate is not taken into account, and therefore the obtained exhaust manifold pressure is greatly affected by engine operating conditions. In this case, the obtained exhaust manifold pressure can be used without problems to determine the intake air amount (a turbocharging pressure) and whether to switch fuel injection amount limitation ON or OFF, but cannot easily be used in control for correcting an injection timing, an injection pressure, and so on.

Hence, from the techniques relating to Patent Documents 1 and 2, it can be said that since the exhaust gas pressure loss varies from moment to moment in accordance with the engine operating conditions, it is difficult to use a measured exhaust gas pressure loss directly in control.

DISCLOSURE OF THE INVENTION

To solve the problem described above, an object of the present invention is to provide an exhaust gas pressure loss calculation device for an engine with which an exhaust gas pressure loss that varies from moment to moment in accordance with operating conditions of the engine can be corrected to a corrected exhaust gas pressure loss, i.e. an exhaust gas pressure loss under a reference condition, which can be used directly in control.

To solve the problem described above, the present invention is an exhaust gas pressure loss calculation device for an engine, having an engine whose exhaust passage includes a filter which collects microparticles contained in an exhaust gas, a calculating unit which calculates a corrected exhaust gas pressure loss serving as a pressure loss under a predetermined reference condition in the exhaust passage, the exhaust gas pressure loss calculation device including: an exhaust gas pressure measuring unit which measures an exhaust gas pressure in the exhaust passage; an exhaust gas mass flow rate measuring unit which measures an exhaust gas mass flow rate in the exhaust passage; and an exhaust gas temperature measuring unit which measures an exhaust gas temperature in the exhaust passage, wherein the calculating unit converts the exhaust gas pressure into a corrected exhaust gas pressure loss serving as the pressure loss under the reference condition from: a relationship between the exhaust gas mass flow rate and an exhaust gas mass flow rate under the reference condition; a relationship between the exhaust gas temperature and an exhaust gas temperature under the reference condition; a relationship between the exhaust gas pressure and an exhaust gas pressure under the reference condition; and a relationship between an exhaust gas viscosity coefficient under a condition of the exhaust gas temperature and a viscosity coefficient of a viscous gas under the reference condition.

Thus, the exhaust gas pressure loss can be converted into the corrected exhaust gas pressure loss serving as the exhaust gas pressure loss under the predetermined reference condition. With the corrected exhaust gas pressure loss, increases and reductions in the pressure loss are evaluated not only from the pressure loss of the filter, but also in pipe parts to the front and rear of the filter, and it may therefore be said that evaluation is performed accurately with respect to the pressure loss. Further, the corrected exhaust gas pressure loss serving as the pressure loss under the predetermined reference condition is not affected by operating conditions of the engine.

Using the corrected exhaust gas pressure loss, EGR control and fuel injection control (for example, common rail pressure control, fuel injection timing control, and control of a number of stages of fuel injection) can be implemented with a high degree of precision. Further, a dramatic increase in the exhaust gas pressure loss leads to reductions in engine performance and fuel efficiency, and therefore, by using the corrected exhaust gas pressure loss to determine the occurrence of a trigger for starting DPF regeneration, issuance of a warning indicating that the amount of microparticles accumulated in the DPF is excessive, and so on, these determinations can be made with a high degree of precision.

Further, the present invention is an exhaust gas pressure loss calculation device for an engine, having an engine whose exhaust passage includes a filter for collecting microparticles contained in an exhaust gas, a calculating unit which calculates a corrected exhaust gas pressure loss serving as a pressure loss under a predetermined reference condition in the exhaust passage, the exhaust gas pressure loss calculation device having an exhaust gas mass flow rate measuring unit which measures an exhaust gas mass flow rate in the exhaust passage, wherein the exhaust passage is divided into at least three sites, namely the filter, an upstream side of the filter, and a downstream side of the filter, each of the divided sites is provided with: a divided site differential pressure measuring unit which measures a front-rear differential pressure of the divided site; and an exhaust gas temperature measuring unit which measures an exhaust gas temperature in the exhaust passage, and the calculating unit converts, for each of the divided sites, the front-rear differential pressure into a corrected differential pressure serving as a front-rear differential pressure under the reference condition from: a relationship between the exhaust gas mass flow rate and an exhaust gas mass flow rate under the reference condition; a relationship between the exhaust gas temperature and an exhaust gas temperature under the reference condition; a relationship between the front-rear differential pressure and a front-rear differential pressure under the reference condition; and a relationship between an exhaust gas viscosity coefficient under a condition of the exhaust gas temperature and a viscosity coefficient of a viscous gas under the reference condition, and the calculating unit calculates the corrected exhaust gas pressure loss serving as the pressure loss under the reference condition by adding together the corrected differential pressures relating to the respective divided sites.

Hence, the corrected exhaust gas pressure loss serving as the pressure loss under the predetermined reference condition can be determined using a typical sensor configuration in an engine system having a DPF as a representative example of the filter. Therefore, the technique of the present invention can be applied to a pre-existing engine system including a DPF without the need to add new sensors.

Further, an exhaust gas purification device which comprises the filter and an oxidation catalyst disposed on an upstream side of the filter to raise a temperature of the filter, may be disposed in the exhaust passage, the exhaust passage may be divided into six sites, namely an upstream side of the exhaust gas purification device, an inlet portion of the exhaust gas purification device, the oxidation catalyst, the filter, an outlet portion of the exhaust gas purification device, and a downstream side of the exhaust gas purification device, and the corrected exhaust gas pressure loss may be calculated by calculating the corrected differential pressure for each of the six sites.

In so doing, the technique of the present invention can be applied to a typical exhaust gas purification device constituted by an oxidation catalyst and a filter using pre-existing sensors and without adding new sensors. As a result, the present invention can be applied easily by modifying pre-existing facilities.

Further, the calculating unit may calculate the corrected exhaust gas pressure loss repeatedly at fixed period intervals and hold a calculation result obtained in an immediately preceding period, and when the front-rear differential pressure of the filter is smaller than a predetermined threshold, the calculating unit may set the calculation result obtained in the immediately preceding period as the corrected exhaust gas pressure loss without implementing the calculation.

Under a condition where the front-rear differential pressure of the filter is smaller than the predetermined threshold such that precision cannot be obtained easily in the corrected exhaust gas pressure loss, the calculation result of the immediately preceding period is employed instead of performing the calculation for determining the corrected exhaust gas pressure loss. As a result, a situation in which the calculation is implemented under a condition where precision cannot be obtained easily in the corrected exhaust gas pressure loss, leading to deterioration of the calculation result, can be prevented.

Further, by holding the calculation result when the engine is stopped, the corrected exhaust gas pressure loss can be obtained appropriately even at a low exhaust gas flow rate immediately after the engine is restarted.

It is possible, according to the present invention, to provide an exhaust gas pressure loss calculation device for an engine with which an exhaust gas pressure loss that varies from moment to moment in accordance with operating conditions of the engine can be corrected to a corrected exhaust gas pressure loss, i.e. an exhaust gas pressure loss under a reference condition, which can be used directly in control.

BEST MODES FOR CARRYING OUT THE INVENTION

Preferred exemplary embodiments of the present invention will be described in detail below with reference to the drawings. Note, however, that unless specific description is provided to the contrary, dimensions, materials, shapes, relative arrangements, and so on of constitutional components described in the embodiments are merely illustrative examples not intended to limit the scope of the present invention.

First Embodiment

Figure 1:
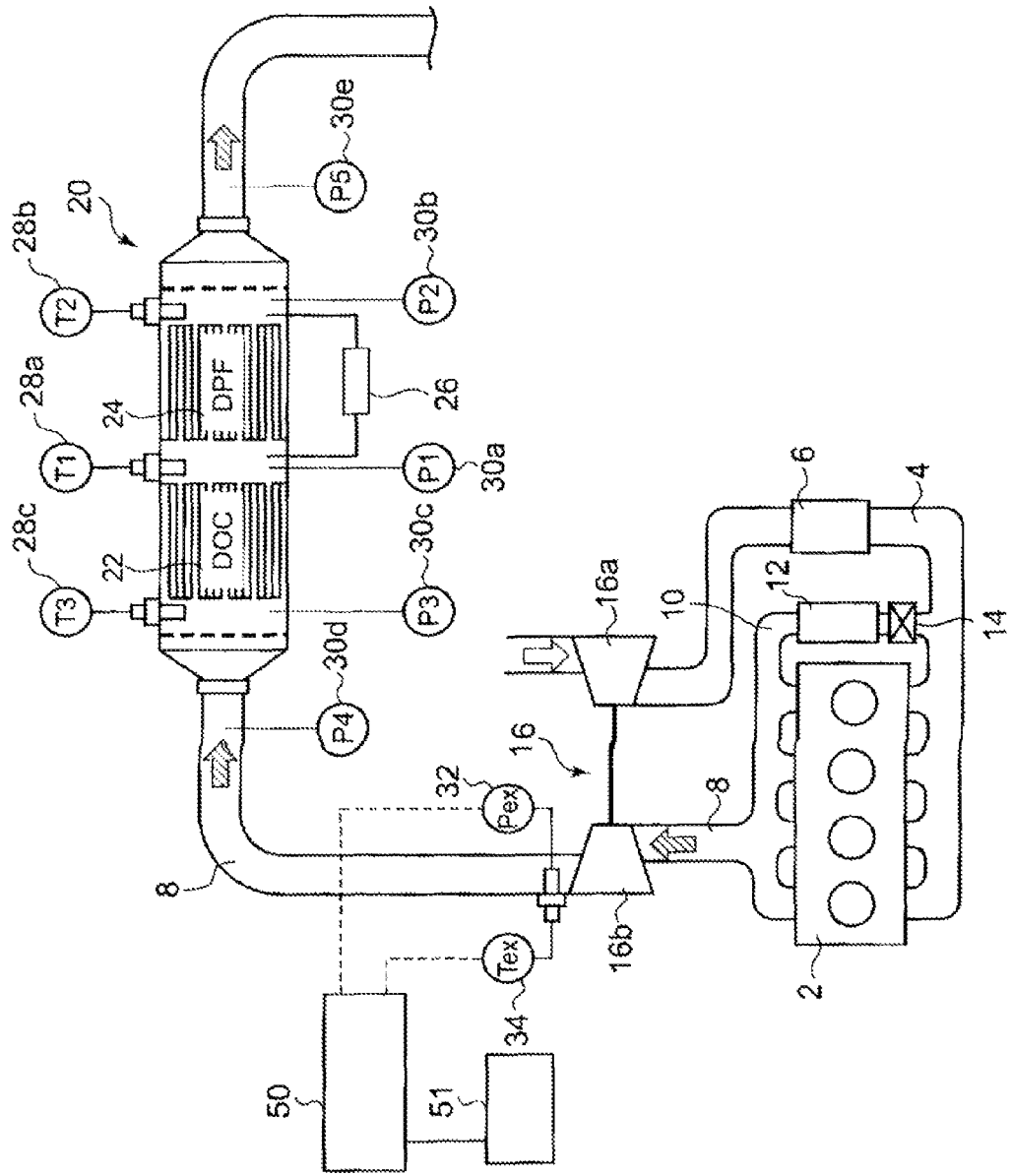
FIG. 1 is a constitutional diagram showing an engine periphery according to a first embodiment.

FIG. 1 is a constitutional diagram showing an engine periphery according to a first embodiment.

An air supply passage 4 and an exhaust passage 8 are connected to an engine 2.

A compressor 16a of a turbocharger 16 is provided in the air supply passage 4. The compressor 16a is driven coaxially with a turbine 16b to be described below. An intercooler 6 that performs heat exchange between supply air flowing through the air supply passage 4 and the atmosphere is provided in the air supply passage 4 on a downstream side of the compressor 16a.

The turbine 16b of the turbocharger 16 is provided in the exhaust passage 8. The turbine 16b is driven by exhaust gas from the engine 2. Further, an EGR passage 10 that recirculates a part of the exhaust gas (EGR gas) to the air supply side is connected to the exhaust passage 8. An EGR control valve 14 that controls a flow rate of the EGR gas flowing through the EGR passage 10 is provided in the EGR passage 10.

An exhaust gas purification device 20 that performs post-processing on the exhaust gas is provided in the exhaust passage 8 on a downstream side of the turbine 16b. The exhaust gas purification device 20 includes a DOC (an oxidation catalyst) 22 having a function for rendering hydrocarbon (HC) and carbon monoxide (CO) contained in the exhaust gas harmless through an oxidation catalyst action and burning and removing soot collected in a DPF 24 by oxidizing NO contained in the exhaust gas to $NO_2$, and a function for raising an exhaust gas temperature using oxidation reaction heat from unburned components in the exhaust gas in a case where the soot collected in the DPF 24 is to be forcibly regenerated, and the DPF 24 for collecting the soot contained as microparticles (PM) in the exhaust gas. The exhaust gas purification device 20 is further provided with a DOC inlet temperature sensor 28c that detects an inlet temperature of the DOC 22, and a DPF inlet temperature sensor 28a and a DPF outlet temperature sensor 28b that detect an inlet temperature and an outlet temperature of the DPF, respectively. A DPD differential pressure sensor 26 that detects a differential pressure between an inlet and an outlet of the DPF 24 is also provided. Furthermore, pressure sensors 30a, 30b, 30c, 30d, 30e are provided to detect pressure at the inlet of the DPF 24, the outlet of the DPF 24, an inlet of the DOC 22, an inlet of the exhaust gas purification device 20, and an outlet of the exhaust gas purification device, respectively.

An exhaust gas pressure sensor 32 that detects an exhaust gas pressure at a turbine outlet and an exhaust gas temperature sensor 34 that detects an exhaust gas temperature at the turbine outlet are provided in the exhaust gas passage 8 at the outlet of the turbine 16b.

Further, a calculator 50 for calculating a corrected exhaust gas pressure loss, to be described below, is provided as a featured constitution of the present invention. Furthermore, 51 denotes an ECU (Electronic Control Unit).

Figure 3:
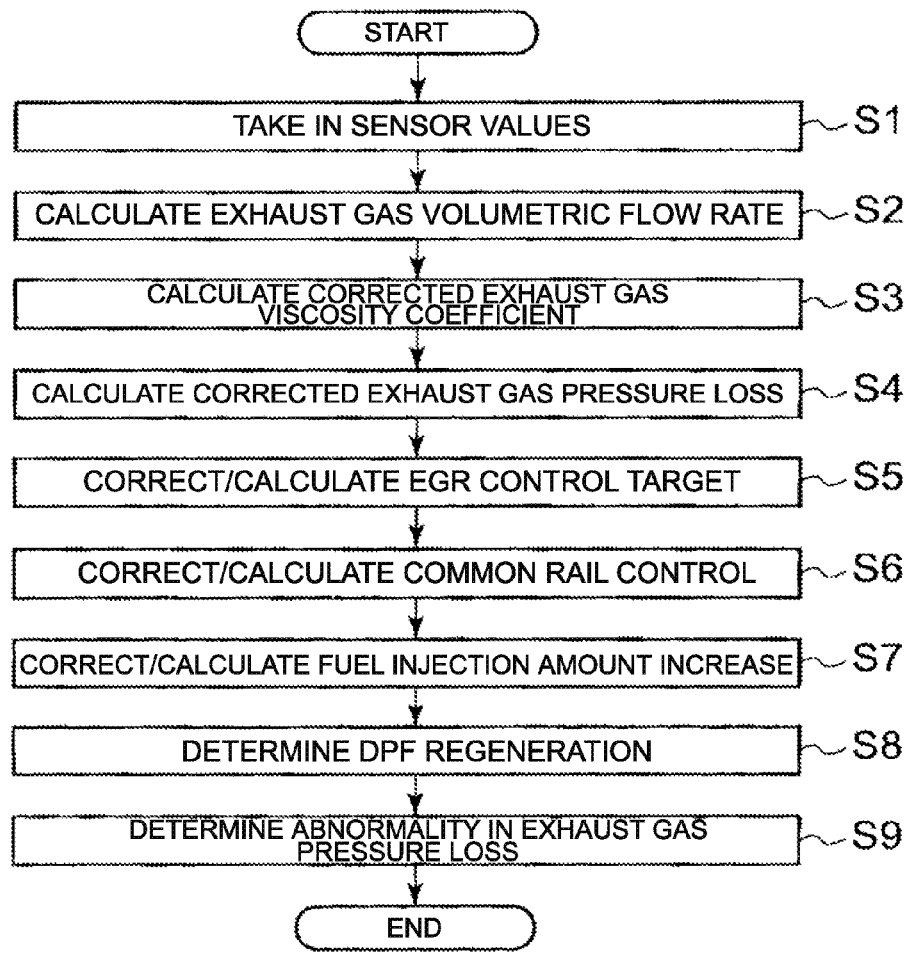
FIG. 3 is a flowchart relating to calculation processing according to the first embodiment.

Calculation processing and control executed by the calculator 50 and the ECU 51 will now be described. FIG. 3 is a flowchart relating to calculation processing according to the first embodiment.

When the processing begins, or in other words when the engine is activated, the routine advances to Step S1.

In Step S1, values of the respective sensors are taken into the calculator 50.

The sensor values read in Step S1 are the exhaust gas pressure detected by the pressure sensor 32, the exhaust gas temperature at the turbine outlet, detected by the temperature sensor 34, a mass flow rate of intake air, and a fuel injection amount to be injected into the engine 2. The mass flow rate of the intake air and the fuel injection amount are normally controlled by the ECU 51, and therefore data held by the ECU 51 maybe read. Alternatively, a detecting unit which detects the mass flow rate of the intake air and the fuel injection amount may be provided.

When Step S1 is complete, the routine advances to Step S2.

In Step S2, an exhaust gas mass flow rate is calculated. The exhaust gas mass flow rate is calculated by adding together the mass flow rate of the intake air and the fuel injection amount.

When Step S2 is complete, the routine advances to Step S3.

In Step S3, a corrected exhaust gas viscosity coefficient is calculated. Here, the corrected exhaust gas viscosity coefficient is obtained by dividing a viscosity coefficient of the exhaust gas under a reference condition, to be described below, by the viscosity coefficient of the exhaust gas.

Figure 2:
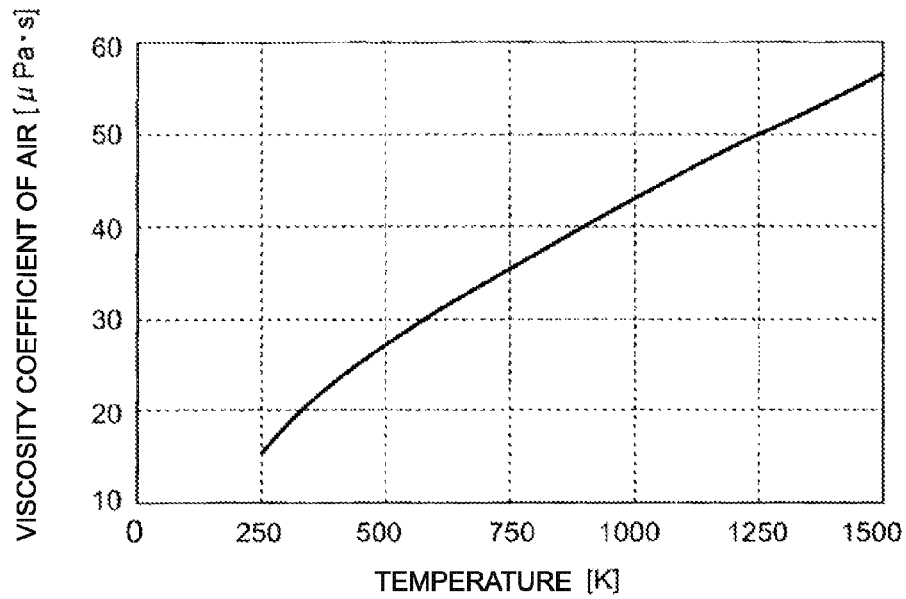
FIG. 2 is a graph showing a relationship between temperature and a viscosity coefficient of air.

FIG. 2 is a graph showing a relationship between temperature and the viscosity coefficient of air. In FIG. 2, the ordinate shows the viscosity coefficient of air [µPa·s], and the abscissa shows the temperature [K]. As shown in FIG. 2, a correlative relationship exists between the temperature and the viscosity coefficient of air.

Further, air constitutes the majority of the components of the exhaust gas, and therefore the viscosity coefficient of the exhaust gas can be approximated to that of air. Hence, as long as the temperature of the exhaust gas is known, the viscosity coefficient of the exhaust gas can be determined using the relationship between the viscosity coefficient of air and the temperature, as shown in FIG. 2.

Therefore, in Step S3, the corrected exhaust gas viscosity coefficient is calculated by determining the viscosity coefficient of the exhaust gas using the exhaust gas temperature at the turbine outlet, detected by the temperature sensor 34, determining the viscosity coefficient of the exhaust gas under the reference condition from a temperature under the reference condition, to be described below, and dividing the viscosity coefficient of the exhaust gas under the reference condition by the viscosity coefficient of the exhaust gas.

When Step S3 is complete, the routine advances to Step S4.

In Step S4, a corrected exhaust gas pressure loss, which is an exhaust gas pressure loss under a predetermined reference condition, is calculated. Here, predetermined temperature and pressure conditions, for example standard conditions (25° C., 1 atm) or the like, may be employed as the reference condition.

A corrected exhaust gas pressure loss $P_{ex,\,adj}$ may be calculated using a following Equation (1).

[Expression 1]

$$P_{exs,adj} = P_{ex} \cdot \frac{g_{exs}}{g_{ex}} \cdot \frac{K_0 + T_b}{K_0 + T_{ex}} \cdot \frac{P_{ex}}{P_0 + P_b} \cdot \frac{\eta_b}{\eta} \qquad (1)$$

In Equation (1), $g_{ex}$ is the exhaust gas mass flow rate [g/sec], which is calculated in Step S2 of the flowchart shown in FIG. 3, $g_{exs}$ is an exhaust gas mass flow rate [g/sec] under the reference condition, $K_0$ is a standard temperature of 273.15 K, $P_{ex}$ is the exhaust gas pressure [kPa], $P_0$ is a standard pressure of 101.325 kPa, $T_b$ is the exhaust gas temperature [° C.] under the reference condition, $P_b$ is an exhaust gas pressure [kPa] under the reference condition, η is the viscosity coefficient [μPa·s] of the exhaust gas, $η_b$ is the viscosity coefficient [μPa·s] of the exhaust gas under the reference condition, and $η_b/η$ is the corrected exhaust gas viscosity coefficient determined in Step S3 of FIG. 3.

According to Equation (1), a gas flow rate that affects the exhaust gas pressure loss is a volumetric flow rate [m³/s], and therefore the corrected exhaust gas pressure loss is determined by correcting the mass flow rate while taking temperature and pressure into account and also correcting the viscosity coefficient of the exhaust gas. As a result, the corrected exhaust gas pressure loss under the reference condition can be determined accurately.

When the engine is provided with a turbocharger, as in this embodiment, the corrected exhaust gas pressure loss at the turbine outlet of the turbocharger is determined.

Note that in a case where the corrected exhaust gas pressure loss obtained from Equation (1) cannot easily be used as is in control due to differences in the responsiveness of the respective sensors for detecting the flow rate, temperature, and pressure, a signal processed by a digital filter (a moving average, a first order lag filter, a high order low pas filter, and so on) may be used as a final corrected exhaust gas pressure loss.

When Step S4 is complete, the routine advances to Steps S5 to S9.

Steps S5 to S9 illustrate usage examples of the corrected exhaust gas pressure loss. Not all of Steps S5 to S9 need be implemented, and Steps S5 to S9 need not be implemented in order.

In Step S5, a control target of an EGR amount is determined on the basis of the corrected exhaust gas pressure loss. In so doing, a nitrogen oxide reduction effect of EGR (exhaust gas recirculation) is obtained regardless of whether or not exhaust gas microparticles are retained in the DPF.

Figure 4:
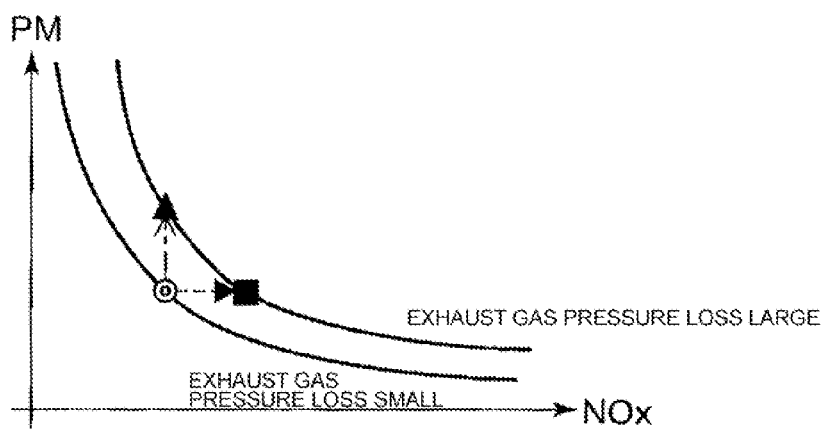
FIG. 4 is a graph showing a relationship between PM accumulated in a DPF and discharged $NO_x$.

FIG. 4 is a graph showing a relationship between the microparticles (PM) accumulated in the DPF and discharged nitrogen oxide ($NO_x$) in cases where the exhaust gas pressure loss is small and large. Further, FIG. 5 is a conceptual diagram showing a breakdown of the supply air.

Figure 5A:
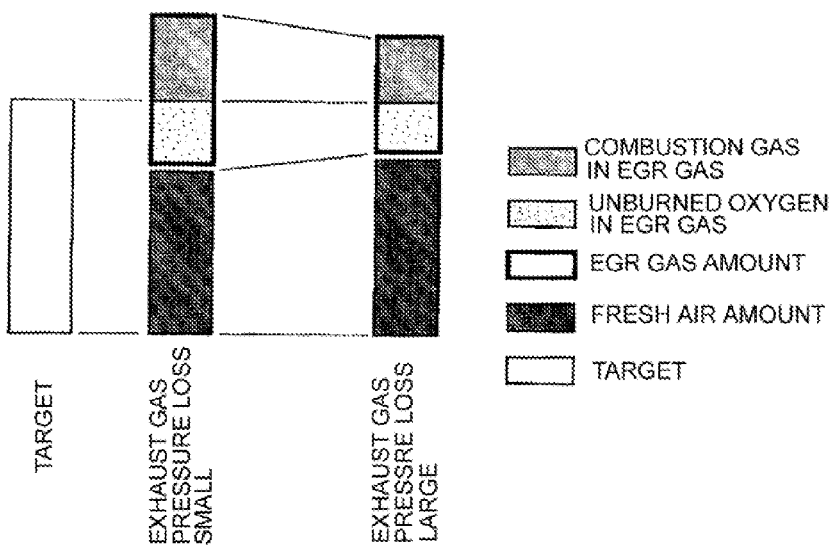
FIG. 5 is a conceptual diagram showing a breakdown of supply air.

In FIG. 5(a), when the exhaust gas pressure rises, control is performed to maintain an excess oxygen ratio at a target excess oxygen ratio by reducing an EGR gas amount and increasing a fresh air amount. In other words, the control shifts from a double circle to a black square in FIG. 4. In this case, a smoke generation amount can be maintained at a constant amount, but an increase in $NO_x$ discharge occurs due to an increase in an oxygen concentration.

Figure 5B:
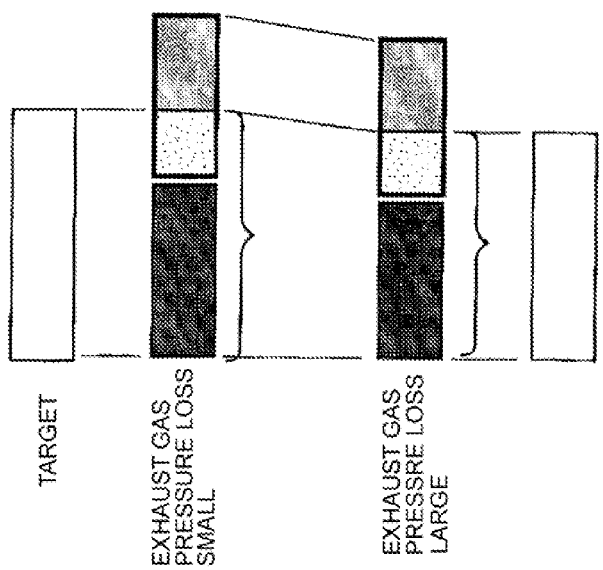

In FIG. 5(b), when the exhaust gas pressure rises, control is performed to keep ratios of the fresh air gas and the EGR gas constant relative to an amount of supplied gas (fresh air+EGR gas). In other words, the control shifts from the double circle to a black triangle in FIG. 4. In this case, the $NO_x$ discharge amount can be kept constant, but an increase in the amount of PM accumulated in the DPF occurs due to a reduction in an oxygen amount.

Using the corrected exhaust gas pressure loss, the exhaust gas pressure loss can be evaluated accurately, and as a result, EGR-related control such as that described above can be implemented with a high degree of precision.

In Step S6, an increase in harmful substances contained in the exhaust gas due to an increase in the exhaust gas pressure loss can be suppressed by issuing a correction control command to a common rail fuel injection system. Examples of the correction control include smoke suppression by increasing a rail pressure and $No_x$ reduction by delaying an injection timing.

Note that a common rail fuel injection system is a system in which fuel is stored at an extremely high pressure in a tubular container known as a common rail prior to being injected into engine cylinders, and the fuel is injected by computer control.

In Step S7, a reduction in maximum output caused by a reduction in fuel efficiency due to an increase in the exhaust gas pressure loss can be suppressed.

In Steps S8 and S9, a dramatic increase in the exhaust gas pressure loss leads to reductions in engine performance and fuel efficiency, and therefore the exhaust gas pressure loss is used to determine the occurrence of a trigger for starting DPF regeneration, the issuance of a warning indicating that the amount of microparticles accumulated in the DPF is excessive, and so on. At this time, these determinations can be made more appropriately by using the corrected exhaust gas pressure loss at the engine outlet.

Second Embodiment

Figure 6:
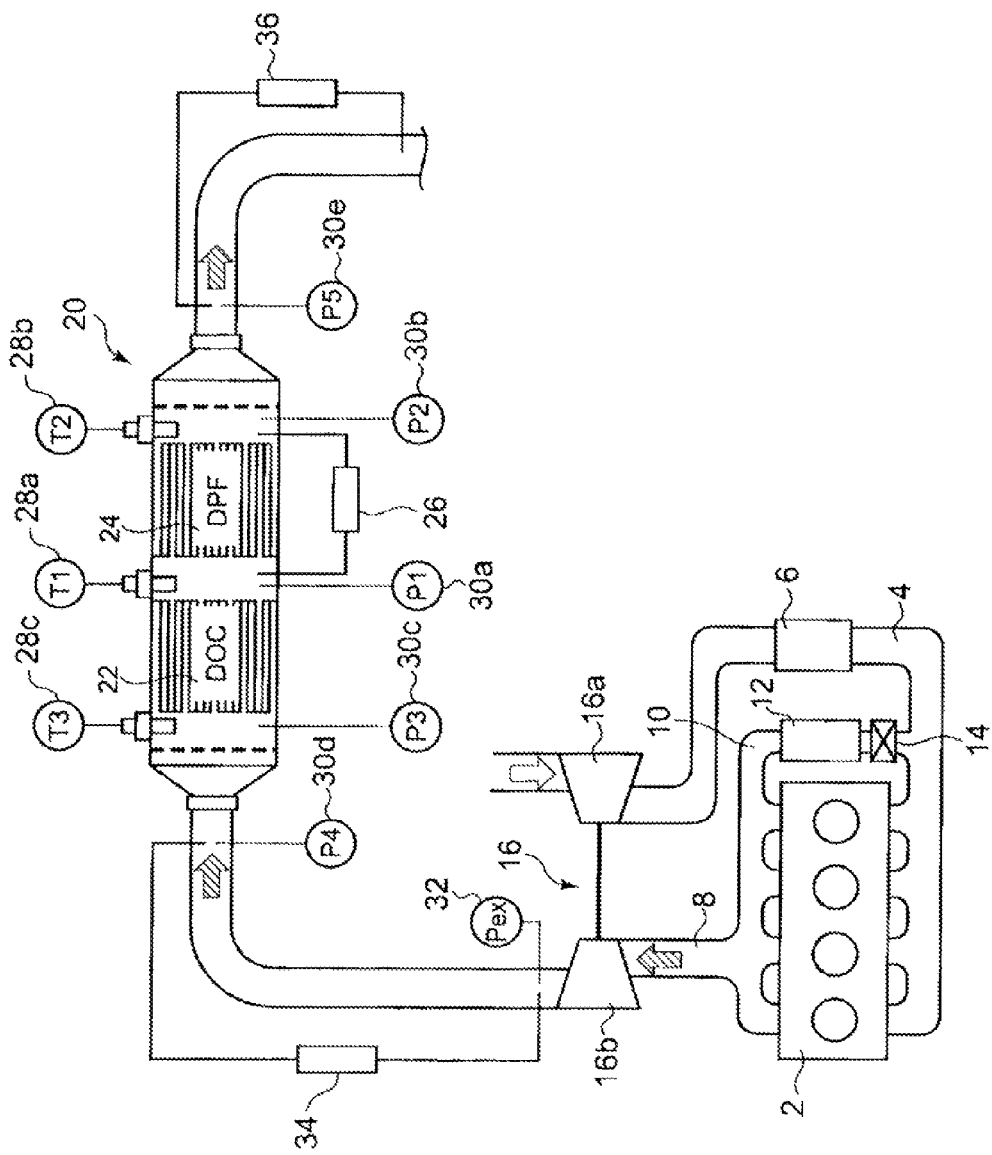
FIG. 6 is a constitutional diagram showing an engine periphery according to a second embodiment.

FIG. 6 is a constitutional diagram showing an engine periphery according to a second embodiment.

Identical reference symbols to those used in the constitutional diagram showing the engine periphery according to the first embodiment in FIG. 1 are allocated to components having identical actions and effects, and description thereof has been omitted.

In FIG. 6, an exhaust pipe pressure loss gauge 34 that detects an exhaust pipe pressure loss from the outlet of the turbine 16b to the inlet of the exhaust gas purification device 20 and an exhaust pipe pressure loss gauge 36 that detects the exhaust gas pressure loss from the outlet of the exhaust gas purification device 20 onward are provided.

Figure 7:
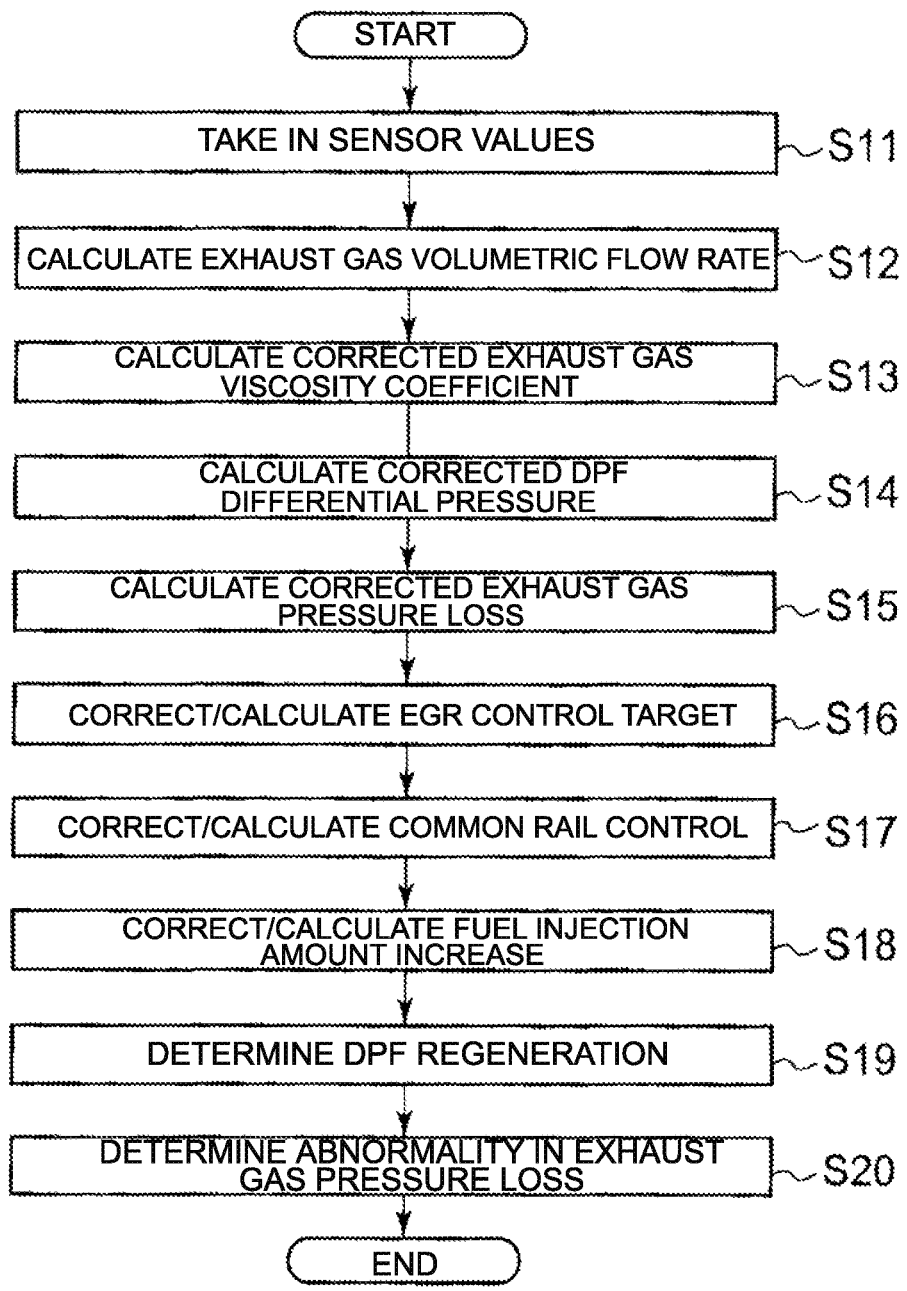
FIG. 7 is a flowchart relating to calculation processing according to the second embodiment.

FIG. 7 is a flowchart relating to calculation processing according to the second embodiment.

When the processing begins, or in other words when the engine is activated, the routine advances to Step S11.

In Step S11, values of the respective sensors are taken into the calculator (not shown).

The sensor values read in Step S11 are the DPF front-rear differential pressure detected by the DPF differential pressure sensor 26, the detection values of the temperature sensors 28a and 28b, or in other words the temperatures at the inlet and the outlet of the DPF 24, the mass flow rate of the intake air, and the fuel injection amount to be injected into the engine 2.

When Step S12 is complete, the routine advances to Step S12.

In Step S12, the exhaust gas mass flow rate is calculated. The exhaust gas mass flow rate is calculated by adding together the mass flow rate of the intake air and the fuel injection amount.

When Step S12 is complete, the routine advances to Step S13.

In Step S13, the corrected exhaust gas viscosity coefficient is calculated. Here, the corrected exhaust gas viscosity coefficient is determined in a similar manner to Step S3 of FIG. 2, using an average value of the detection values of the temperature sensors 28a and 28b, or in other words the temperatures at the inlet and the outlet of the DPF 24, as the exhaust gas temperature.

When Step S13 is complete, the routine advances to Step S14.

In Step S14, a corrected differential pressure under the reference condition is calculated. Here, the corrected differential pressure is obtained by converting the front-rear differential pressure of the DPF into a differential pressure of the DPF under the reference condition.

A corrected differential pressure $\Delta P_{dpf,\,adj}$ may be calculated using a following Equation (2).

[Expression 24]

$$\Delta P_{dpf,adj} = \Delta P_{dpf} \cdot \frac{g_{exs}}{g_{ex}} \cdot \frac{K_0 + T_b}{K_0 + T_{12}} \cdot \frac{P_{12}}{P_0 + P_b} \cdot \frac{\eta_b}{\eta} \quad (2)$$

In Equation (2), $g_{ex}$ is the exhaust gas mass flow rate [g/sec], which is calculated in Step S2 of the flowchart shown in FIG. 7, $g_{exs}$ is the exhaust gas mass flow rate [g/sec] under the reference condition, $K_0$ is the standard temperature of 273.15 K, $P_0$ is the standard pressure of 101.325 kPa, $T_{12}$ is an average gas temperature [° C.] in the DPF, or in other words an average value of a gas temperature T1 at the inlet of the DPF, detected by the temperature sensor 28a, and a gas temperature T2 at the outlet of the DPF, detected by the temperature sensor 28b, $P_{12}$ is an average pressure [kPa] in the DPF, or in other words an average value of a pressure P1 at the inlet of the DPF, detected by the pressure sensor 30a, and a pressure P2 at the outlet of the DPF, detected by the pressure sensor 30b, $T_b$ is the average gas temperature [° C.] in the DPF under the reference condition, $P_b$ is the average gas pressure [kPa] in the DPF under the reference condition, $\eta$ is the viscosity coefficient [μPa·s] of the exhaust gas, $\eta_b$ is the viscosity coefficient [μPa~s] of the exhaust gas under the reference condition, and $\eta_b/\eta$ is the corrected exhaust gas viscosity coefficient determined in Step S13 of FIG. 7.

According to Equation (2), the gas flow rate that affects the front-rear differential pressure of the DPF is a volumetric flow rate [m³/s], and therefore the corrected exhaust gas pressure loss is determined by correcting the mass flow rate while taking temperature and pressure into account and also correcting the viscosity coefficient of the exhaust gas. As a result, the corrected exhaust gas pressure loss under the reference condition can be determined accurately.

Note that in a case where the corrected differential pressure obtained from Equation (2) cannot easily be used as is in control due to differences in the responsiveness of the respective sensors for detecting the flow rate, temperature, and pressure, a signal processed by a digital filter (a moving average, a first order lag filter, a high order low pas filter, and so on) may be used as the final corrected differential pressure.

When low pass filter processing is performed on the corrected differential pressure $\Delta P_{dpf,\,adj}$ the final corrected differential pressure is calculated using a following Equation (3).

[Expression 3]

$$\Delta \tilde{P}_{dpf,adj} = \frac{1}{1+T_s} \Delta P_{dpf,adf} \quad (3)$$

$\Delta \tilde{P}_{dpf,adj}$: final corrected differential pressure
T: low pass filter (LPF) time constant [sec]
s: Laplacian operator Further, when this is described using a discrete time system, a following Equation (4) is obtained.

[Expression 4]

$$\Delta \tilde{P}_{dpf,adj}[k] = \Delta \tilde{P}_{dpf,adj}[k-1] + \left(\Delta \tilde{P}_{dpf,adj}[k] - \Delta \tilde{P}_{dpf,adj}[k-1]\right)\frac{T_s}{T} \quad (4)$$

$T_s$: calculation period of digital filter

When Step S14 of FIG. 7 is complete, the routine advances to Step S15.

In Step S15, first, similarly to Steps S11 to S14, an exhaust pipe pressure loss $\Delta P_{tp1,\,adj}$ under the reference condition between the pressure sensors 32 and 30d on the upstream side of the exhaust gas purification device 20, a pressure loss $\Delta P_{43,\,adj}$ under the reference condition between the pressure sensors 30d and 30c on the exhaust gas purification device inlet side, a pressure loss $\Delta P_{31,\,adj}$ under the reference condition between the pressure sensors 30c and 30a to the front and rear of the DOC, a pressure loss $\Delta P_{25,\,adj}$ under the reference condition between the pressure sensors 30b and 30e on the exhaust gas purification device outlet side, and an exhaust pipe pressure loss $\Delta P_{tp2,\,adj}$ under the reference condition from the pressure sensor 30e onward on the downstream side of the exhaust gas purification device 20 are determined.

Next, the corrected exhaust gas pressure loss $P_{ex,\,adj}$ is calculated using a following Equation (5) by adding together the respective aforesaid pressure losses.

[Expression 5]

$$P_{ex,adj} = (\Delta P_{tp1,adj} + \Delta P_{43,adj}) + \Delta P_{31,adj} + \Delta \tilde{P}_{dpf,adj} + (\Delta P_{25,adj} + \Delta P_{tp2,adj}) \quad (5)$$

When Step S15 is complete, the routine advances to Step S16.

Steps S16 to S20 are identical to Steps S5 to S9 of FIG. 3, described in the first embodiment, and therefore description thereof has been omitted.

According to the second embodiment, the corrected exhaust gas pressure loss, which is the pressure loss under the predetermined reference condition, can be determined using a typical sensor configuration in an engine system having an exhaust gas purification device that includes a DPF and a DOC. Therefore, the technique of the present invention can be applied to a pre-existing engine system including a DPF without the need to add new sensors.

Third Embodiment

A basic flow for determining the corrected exhaust gas pressure loss according to a third embodiment is similar to that of the flowchart shown in FIG. 7, described in the second embodiment. However, a calculation method for calculating the corrected DPF differential pressure, illustrated in Step S14 of FIG. 7, differs from the second embodiment.

Calculation of the corrected DPF differential pressure according to the third embodiment will now be described using FIG. 8.

Figure 8:
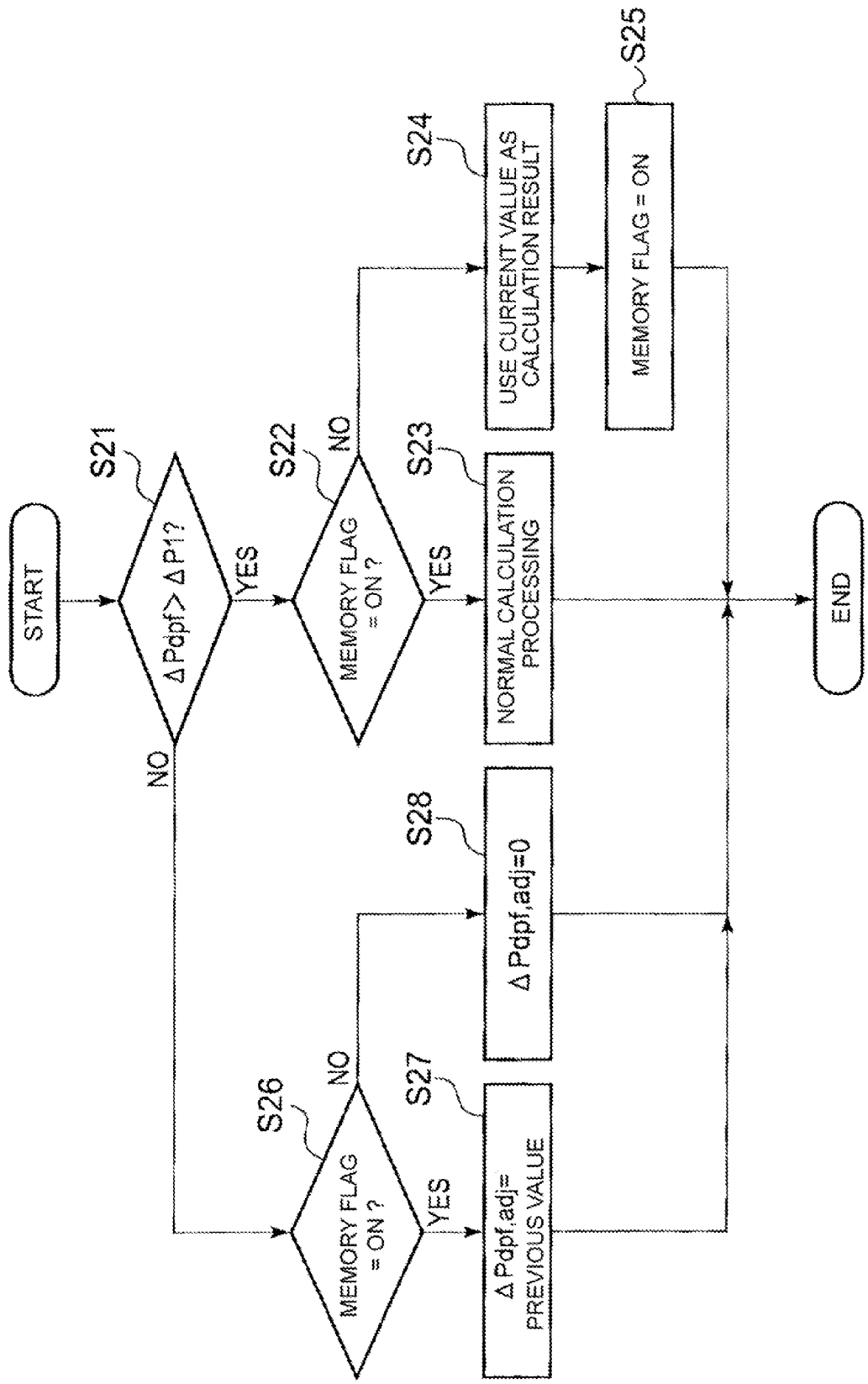
FIG. 8 is a flowchart showing a method of calculating a corrected DPF differential pressure according to a third embodiment.

FIG. 8 is a flowchart showing the method of calculating the corrected DPF differential pressure according to the third embodiment.

When the processing begins, the routine advances to Step S21.

In Step S21, a determination is made as to whether or not the DPF front-rear differential pressure detected by the DPF differential pressure sensor 26 is greater than a predetermined value $\Delta$P1.

The value $\Delta$P will now be described.

When the corrected exhaust gas pressure loss is calculated on the basis of the corrected differential pressure in the second embodiment, the exhaust gas flow rate is low, making it difficult to obtain precision in the corrected exhaust gas pressure loss under an operating condition where the front-rear differential pressure $\Delta P_{dpf}$ of the DPF is small. For example, when a measurement error of 0.1 [kPa] occurs in the DPF front-rear differential pressure under a condition where the DPF front-rear differential pressure is no greater than 1.0 [kPa], and this DPF front-rear differential pressure is corrected to a value under the reference condition, the error increases by approximately a multiple of 5 to 10. When data obtained under a condition where measurement precision cannot easily be obtained in the DPF front-rear differential pressure are handled similarly to data obtained under other conditions, a large error occurs in the calculated value of the corrected exhaust gas pressure loss. Hence, a minimum value at which sufficient measurement precision can be obtained in the DPF front-rear differential pressure is set at ΔP1.

When YES, or in other words that $\Delta P_{dpf}$ is larger than ΔP1, is determined in Step S21, the routine advances to Step S22.

In Step S22, a determination is made as to whether or not a memory flag is ON. Here, memory flag ON indicates a state in which the previous corrected exhaust gas pressure loss is stored in the calculator.

When YES, or in other words that the memory flag is ON, is determined in Step S22, the routine advances to Step S23, where normal calculation processing is performed to determine the corrected exhaust pressure loss. The processing is then terminated. Here, the normal calculation processing is processing to calculate the corrected differential pressure $\Delta P_{dpf,\ adj}$ using Equation (2), as described in the second embodiment.

When NO, or in other words that the memory flag is OFF, is determined in Step S22, the routine advances to Step S24, where the corrected differential pressure $\Delta P_{dpf,\ adj}$ is determined using Equation (2) and this corrected differential pressure $\Delta P_{dpf,\ adj}$ is employed. Once the corrected differential pressure $\Delta P_{dpf,\ adj}$ has been determined, the routine advances to Step S25, where the determined $\Delta P_{dpf,\ adj}$ is stored in the calculator. The processing is then terminated.

When NO, or in other words that $\Delta P_{dpf}$ is equal to or smaller than ΔP1, is determined in Step S21, the routine advances to Step S26.

In Step S26, a determination is made as to whether or not the memory flag is ON.

When YES, or in other words that the memory flag is ON, is determined in Step S26, the routine advances to Step S27, where the stored previous corrected differential pressure $\Delta P_{dpf,\ adj}$ is employed. The processing is then terminated. When NO, or in other words that the memory flag is OFF, is determined in Step S26, the routine advances to Step S28, where $\Delta P_{dpf,adj}=0$ is set. The processing is then terminated.

According to the third embodiment, under a condition where the front-rear differential pressure of the DPF is smaller than a predetermined threshold (ΔP1) such that precision cannot be obtained easily in the corrected exhaust gas pressure loss, a calculation result of an immediately preceding period is employed instead of performing a calculation to determine the corrected exhaust gas pressure loss. As a result, a situation in which the calculation is implemented under a condition where precision cannot be obtained easily in the corrected exhaust gas pressure loss, leading to deterioration of the calculation result, can be prevented.

Further, by holding the calculation result when the engine is stopped, the corrected exhaust gas pressure loss can be obtained appropriately even at a low exhaust gas flow rate immediately after the engine is restarted.

Industrial Applicability

The present invention can be used as an exhaust gas pressure loss calculation device for an engine with which an exhaust gas pressure loss that varies from moment to moment in accordance with operating conditions of the engine can be corrected to a corrected exhaust gas pressure loss, i.e. an exhaust gas pressure loss under a reference condition, which can be used directly in control.

The invention claimed is:

1. A corrected exhaust gas pressure loss calculation device comprising an engine whose exhaust passage comprises a filter which collects microparticles contained in an exhaust gas, a calculating unit which calculates a corrected exhaust gas pressure loss serving as an exhaust gas pressure loss under a predetermined reference condition in the exhaust passage,
    the corrected exhaust gas pressure loss calculation device comprising:
    an exhaust gas pressure measuring unit which measures an exhaust gas pressure in the exhaust passage;
    an exhaust gas mass flow rate measuring unit which measures an exhaust gas mass flow rate in the exhaust passage; and
    an exhaust gas temperature measuring unit which measures an exhaust gas temperature in the exhaust passage,
    wherein the calculating unit converts the exhaust gas pressure into a corrected exhaust gas pressure loss serving as the exhaust gas pressure loss under the reference condition from:
    a relationship between the exhaust gas mass flow rate and an exhaust gas mass flow rate under the reference condition;
    a relationship between the exhaust gas temperature and an exhaust gas temperature under the reference condition;
    a relationship between the exhaust gas pressure and an exhaust gas pressure under the reference condition; and
    a relationship between an exhaust gas viscosity coefficient under a condition of the exhaust gas temperature and a viscosity coefficient of a viscous gas under the reference condition.

2. A corrected exhaust gas pressure loss calculation device comprising an engine whose exhaust passage comprises a filter for collecting microparticles contained in an exhaust gas, a calculating unit which calculates a corrected exhaust gas pressure loss serving as a pressure loss under a predetermined reference condition in the exhaust passage,
    the corrected exhaust gas pressure loss calculation device comprising an exhaust gas mass flow rate measuring unit which measures an exhaust gas mass flow rate in the exhaust passage,
    wherein the exhaust passage is divided into at least three sites, namely the filter, an upstream side of the filter, and a downstream side of the filter,
    each of the divided sites is provided with:
    a divided site differential pressure measuring unit which measures a front-rear differential pressure of the divided site; and
    an exhaust gas temperature measuring unit which measures an exhaust gas temperature in the exhaust passage, and
    the calculating unit converts, for each of the divided sites, the front-rear differential pressure into a corrected differential pressure serving as a front-rear differential pressure under the reference condition from:
    a relationship between the exhaust gas mass flow rate and an exhaust gas mass flow rate under the reference condition;
    a relationship between the exhaust gas temperature and an exhaust gas temperature under the reference condition;
    a relationship between the front-rear differential pressure and a front-rear differential pressure under the reference condition; and
    a relationship between an exhaust gas viscosity coefficient under a condition of the exhaust gas temperature and a viscosity coefficient of a viscous gas under the reference condition, and
    the calculating unit calculates the corrected exhaust gas pressure loss serving as the pressure loss under the reference condition by adding together the corrected differential pressures relating to the respective divided sites.

3. The corrected exhaust gas pressure loss calculation device provided in an exhaust passage of an engine according to claim 2, wherein the calculating unit calculates the corrected exhaust gas pressure loss repeatedly at fixed period intervals and holds a calculation result obtained in an immediately preceding period, and when the front-rear differential pressure of the filter is smaller than a predetermined threshold, the calculating unit sets the calculation result obtained in the immediately preceding period as the corrected exhaust gas pressure loss without implementing the calculation.

4. The corrected exhaust gas pressure loss calculation device provided in an exhaust passage of an engine according to claim 2, wherein an exhaust gas purification device which comprises the filter and an oxidation catalyst disposed on an upstream side of the filter to raise a temperature of the filter, is disposed in the exhaust passage, the exhaust passage is divided into six sites, namely an upstream side of the exhaust gas purification device, an inlet portion of the exhaust gas purification device, the oxidation catalyst, the filter, an outlet portion of the exhaust gas purification device, and a downstream side of the exhaust gas purification device, and the corrected exhaust gas pressure loss is calculated by calculating the corrected differential pressure for each of the six sites.

5. The corrected exhaust gas pressure loss calculation device provided in an exhaust passage of an engine according to claim 4, wherein the calculating unit calculates the corrected exhaust gas pressure loss repeatedly at fixed period intervals and holds a calculation result obtained in an immediately preceding period, and when the front-rear differential pressure of the filter is smaller than a predetermined threshold, the calculating unit sets the calculation result obtained in the immediately preceding period as the corrected exhaust gas pressure loss without implementing the calculation.

* * * * *